Aug. 14, 1951 — J. W. REDHEAD — 2,564,213
AERODYNAMIC VEHICLE ORNAMENT
Filed Oct. 14, 1949 — 2 Sheets-Sheet 1
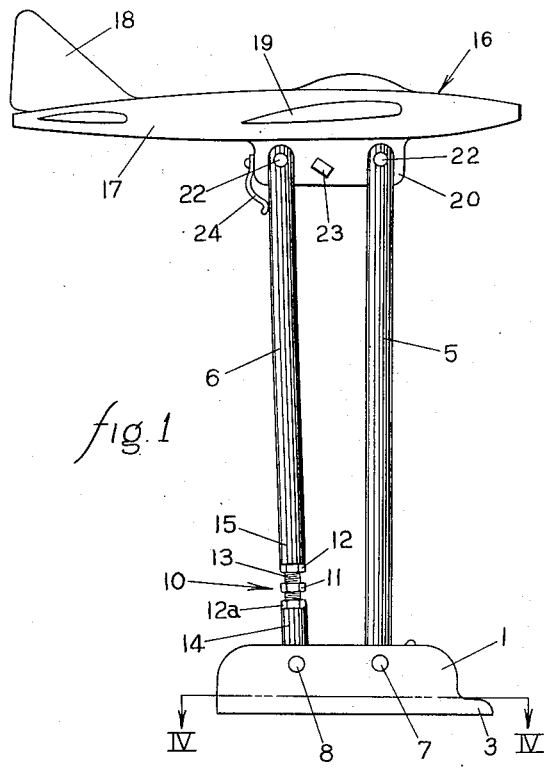
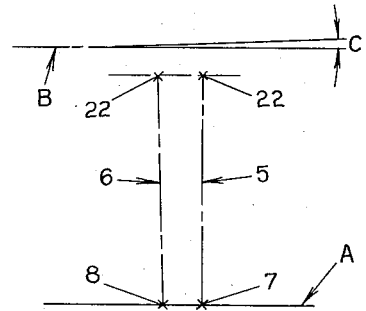
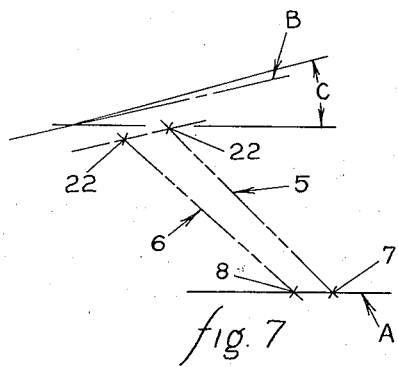
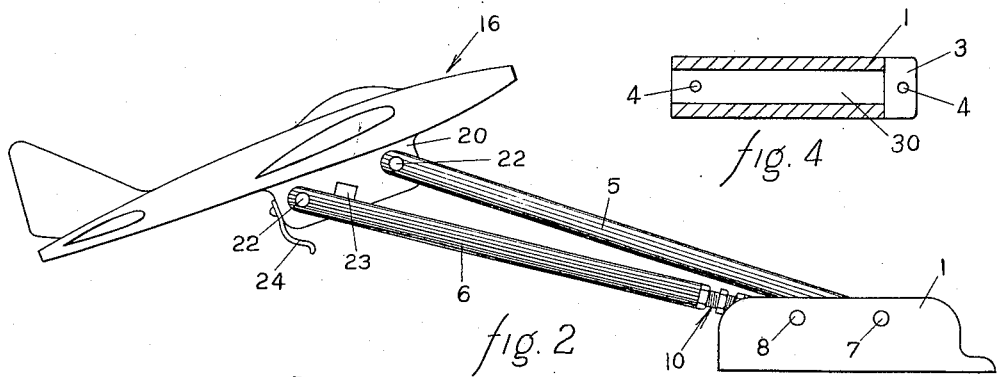
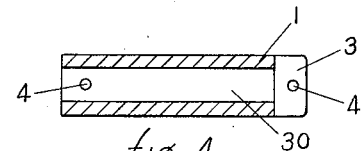
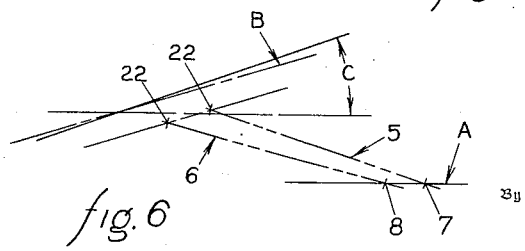
Inventor
JACK W. REDHEAD
Peter P. Price
Attorney

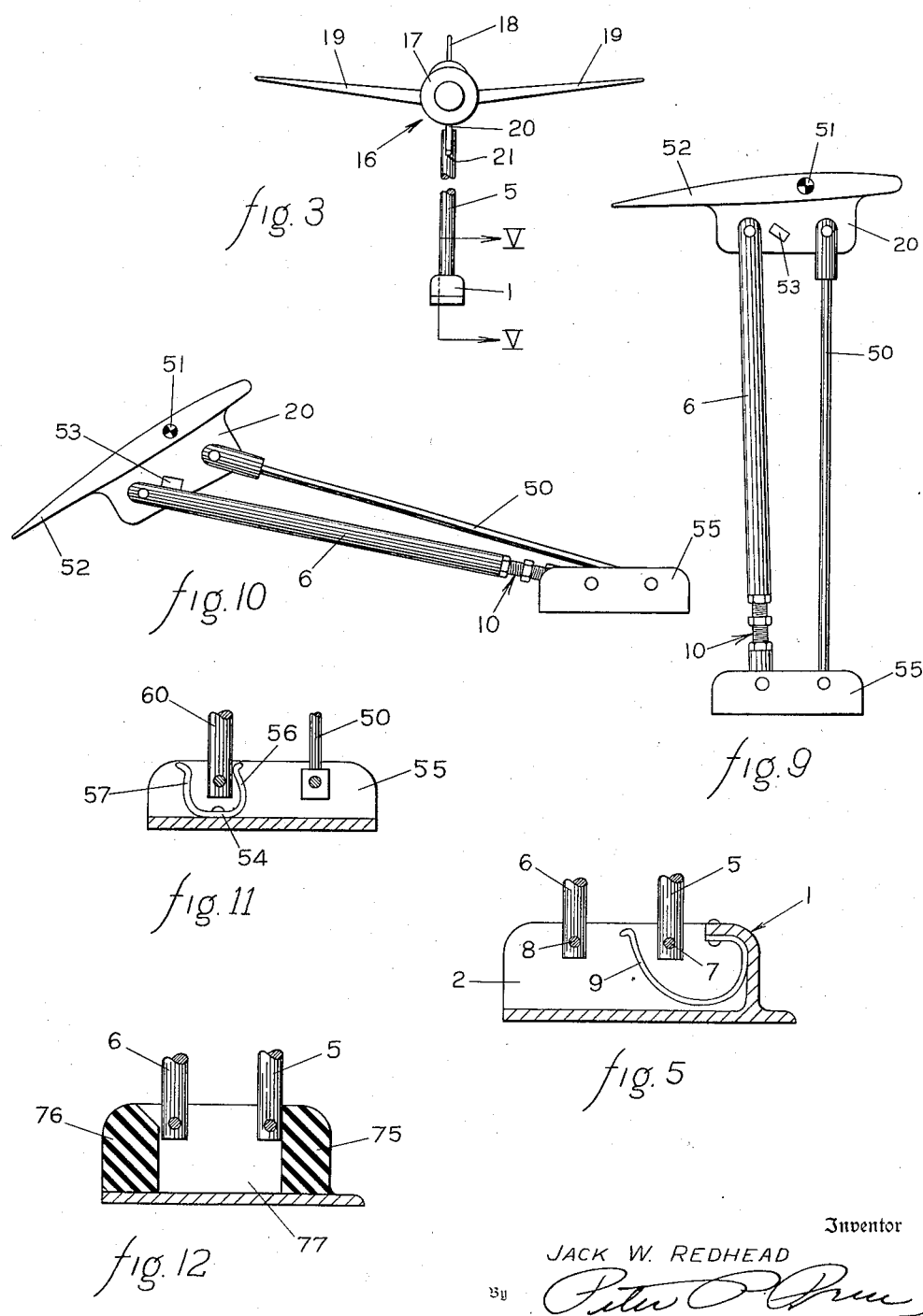

Patented Aug. 14, 1951

2,564,213

UNITED STATES PATENT OFFICE 2,564,213

AERODYNAMIC VEHICLE ORNAMENT

Jack W. Redhead, Lansing, Mich.

Application October 14, 1949, Serial No. 121,250

8 Claims. (Cl. 46—76)

This invention relates to an aerodynamic ornament, and more particularly to the supporting structure for an aerodynamic ornament whereby, as the velocity of movement of the supporting medium, air, increases relative to the aerodynamic ornament, the ornament will rise and the supporting structure will cause the angle of attack of the airfoil member to decrease.

Many ornaments have been created for vehicles, such as automobiles, having, as part of their structure, an airfoil surface whereby the ornament is caused to rise by means of the lift generated by the airfoil surface when the ornament is moved through the air at a sufficient velocity. These numerous ornaments have not been entirely satisfactory, however, for several reasons. Primarily, all of these ornaments, by their design, have had incorporated into them a predetermined fixed angle of attack for the airfoil surface. Such a structural arrangement disregards the basic principles of aerodynamics and, as a result, the ornament has indifferent flight characteristics. It is basic to aerodynamic principles that a given type of airfoil surface, when moved through the air parallel to its chord, will develop a component of lift proportional to the velocity with which it is moved relatively to the air. As the velocity of movement decreases the component of lift may be prevented from decreasing proportionally to the decrease in velocity by increasing the angle of attack. The expedient of increasing the angle of attack to obtain greater lift is, of course, limited by two factors. These factors are: (1) the point at which the airfoil will stall due to the factor of drag and turbulence and (2) the availability of power for generating forward motion. This latter consideration is unimportant so far as aerodynamic automobile ornaments are concerned. The capacity of an airfoil to generate greater lift as the velocity of the airfoil through the supporting medium is increased is limited. However, this limitation, for present conventional airfoil designs, appears at velocities so high that they need not be considered under circumstances attendant the use of articles of this type. Existing aerodynamic ornaments have been limited to a single, predetermined angle of attack, thus creating an inherent conflict in their operating characteristics. By utilizing the same angle of attack at both low and high velocities they have either had to sacrifice good flight characteristics at high velocities or have had to sacrifice the capacity of the ornament to generate sufficient lift to actuate it at reasonably low velocities. Since the higher velocity flight characteristics have normally been considered more desirable, these ornaments have been substantially inoperative except at high velocities.

Another important disadvantage of the previously existing aerodynamic ornaments is the fact that they have been mounted either to slide back on a rigid pole or to rise up a vertical pole as the lift in the airfoil surface is generated. Such methods of mounting make it impractical to change the angle of attack to accommodate varying operating velocities. Further, in such structures the frictional drag of sliding on these supporting posts is so great that the ornament must be moved at high velocities before sufficient lift can be generated to overcome this friction. Such aerodynamic ornaments are incapable of properly utilizing the forces incident to moving an airfoil through a supporting medium. Therefore, such ornaments have been unable to provide an article which truly exhibited the beauty of an airfoil surface in free flight.

My invention overcomes these difficulties and produces an aerodynamic instrument in which the angle of attack is automatically changed as the velocity with which the airfoil surface is moved through the supporting medium increases. This permits the instrument to function efficiently at both high and low velocities. In addition, my invention so mounts the airfoil surface that it is capable of rising and moving forwardly into the stream of the supporting medium to assume a true position of free flight.

Therefore, it is a primary object of my invention to provide an aerodynamic ornament having incorporated thereinto means for varying the angle of attack substantially in inverse proportion to the velocity with which the ornament is moved through the supporting medium.

A further object of my invention is to provide an aerodynamic ornament capable of operating efficiently at both low and high velocities.

It is an additional object of my invention to provide an aerodynamic ornament capable of moving forwardly into the stream of the supporting medium as the velocity of the ornament's movement increases.

It is a further additional object of my invention to provide an aerodynamic ornament having an attractive appearance and capable of economical fabrication.

Other objects and purposes of my invention will be immediately seen by those acquainted with the design of vehicle ornaments upon reading the following specification and the accompanying drawings.

In the drawings:

Figure 1 is a side elevation view of an aerodynamic ornament incorporating my improved supporting structure showing the airfoil surface in raised flight position.

Figure 2 is a side elevation view of an aerodynamic ornament incorporating my improved supporting structure showing the airfoil surface in non-flight or rest position.

Figure 3 is a front view of an aerodynamic ornament incorporating my improved supporting structure showing the airfoil surface in fully raised flight position.

Figure 4 is a sectional view of the base portion of my improved supporting structure for an aerodynamic ornament taken along the plane IV—IV of Figure 1.

Figure 5 is a sectional view of the base portion of my improved supporting structure for an aerodynamic ornament taken along the plane V—V of Figure 3.

Figure 6 is a diagrammatic presentation of the relative positions of the parts constituting my improved supporting structure for an aerodynamic ornament when the ornament is at rest.

Figure 7 is a diagrammatic presentation of the relative positions of the parts of my improved supporting structure for an aerodynamic ornament when the ornament is in partially raised flight position.

Figure 8 is a diagrammatic presentation of the relative positions of the parts of my improved supporting structure for an aerodynamic ornament when the ornament is in fully raised flight position.

Figure 9 is a side elevation view of a modification of my improved supporting structure for an aerodynamic ornament in fully raised flight position.

Figure 10 is a side elevation view of the modified supporting structure for an aerodynamic ornament in non-flight or rest position.

Figure 11 is a sectional elevation view of the base for the modified supporting structure for an aerodynamic ornament.

Figure 12 is a sectional elevation view of a modified base for my improved supporting structure for an aerodynamic ornament.

In executing the objects and purposes of my invention I have provided an airfoil surface having predetermined aerodynamic characteristics. I have mounted this airfoil surface on a pair of pivoted supports whereby the airfoil surface may move from a position of rest forwardly in the direction of flight movement to an erected position of free flight as the velocity of movement of the airfoil surface is increased. By means of the two supporting legs, the angle of attack of the airfoil surface is reduced as the ornament rises to fully raised flight position.

In the following description the terms "forwardly" and "rearwardly" are freely used and are to be considered as "forwardly" in the normal direction of flight of the airfoil surface and "rearwardly" away therefrom. The terms "upwardly" and "downwardly" are also freely used and are to be considered "upwardly" in the direction shown in Figure 1 and "downwardly" away therefrom.

In the following description I have described the aerodynamic ornament as an airplane. However, such description is used for the purpose of illustration only and is not to be considered as limiting. Any number of different airfoil surfaces may be used in place of an airplane and will produce exactly the same results with substantially the same efficiency, so far as flight and lift are concerned. This application is intended to include all such airfoil surfaces which may be used, incorporating the principles of my invention as set forth herein.

Referring to the drawings in greater detail, the numeral 1 refers to a base having a longitudinal central slot 2. The base 1 is provided with a forwardly extending flange 3 suitable for seating on the surface of the vehicle to which it is to be attached. A pair of holes 4 are provided, one in the flange 3 and the other in the lower wall 30 of the base 1, for installation of the base mounting bolts whereby the aerodynamic ornament may be attached to the hood, fenders or any other suitable part of an automobile. It will be understood that the contour of the lower wall 30 of the base 1 may be of any shape to accommodate the contour of the surface to which it is to be attached.

A pair of legs 5 and 6 extend into the slot 2 of the base 1 and are pivotally mounted to the base 1 by means of the pins 7 and 8, respectively. The particular method of attaching the legs 5 and 6 to the base 1 is unimportant so long as the legs are free to pivot in the direction of movement of the ornament. The legs 5 and 6 are spaced substantially apart, in tandem, in a forwardly and rearwardly direction. The legs 5 and 6 may be in pairs transversely of the direction of movement of the ornament. Thus, the ornament may be supported by four or more legs so long as the two groups of legs, in the direction of movement of the ornament, bear the same relationship to each other as the legs 5 and 6. The exact relationship the legs 5 and 6 bear to each other is explained more fully hereinafter. A spring 9 is seated within the slot 2 and has one end rigidly attached to the base 1 and the other end free to engage the leg 5 as the leg 5 pivots rearwardly. The purpose of the spring 9 will be explained more fully hereinafter.

The leg 6 is provided with an expansible joint 10. The expansible joint 10 includes a nut 11 having rigidly secured to it a shaft 13 equipped with a right hand thread on one side of the nut and a left hand thread on the other side of the nut. The threaded shaft 13 engages the stud 14 of the leg 6 and the main body portion 15 of the leg 6. Locking nuts 12 and 12a may be used to secure the expansible joint 10 against movement. The described design of the expansion joint 10 is but one of numerous conventional designs which may be employed to effect the desired result.

The upper ends of the legs 5 and 6 are provided with slots 21 into which is received the block or wall 20. The longitudinal axis of the wall 20 is parallel to the direction of flight of the airplane. The legs 5 and 6 are pivotally attached to the wall 20 by means of the pins 22. The slots 21 are sufficiently deep that the wall 20 will not engage the end wall of the slots as the position of the legs changes from that assumed when the ornament is in full flight, as shown in Figure 1, to the position of rest as shown in Figure 2. A stop 23 is provided on the wall 20 to engage the leg 6 as the legs 5 and 6 reach the lower limit of their travel as shown in Figure 2. An airplane 16 having a body 17, empennage assembly 18 and wings 19 is mounted on the wall 20 in such a manner that the wall 20 is midway between the wing tips of the airplane 16. The airplane 16 and wall 20 are joined by means of cement, screws, rivets or other suitable joining means. It will be understood that the wall 20 may be made as an integral part of the airplane 16. The wings 19 constitute the airfoil surface for providing all of the lift by which the ornament operates. The airplane 16 is so designed that the wings 19, when the airplane is in level flight, have a small angle of attack.

The leg 5, when the airplane 16 is in fully erected flight position, is perpendicular to the base 1 but the leg 6 slopes away from the leg 5, upwardly from the base 1, at an angle of approximately 2°. This is the angle of divergence of the legs. The preferred structure embodies a design in which the pins 7 and 8 and the pins 22, when the airplane 16 is in fully erected flight position, are in parallel horizontal planes and the rearward leg 6 is inclined away from the forward leg 5 between 1½° and 5°. It is possible to operate my invention with the leg 6 inclined between 1° and 8°; however, the extremities of this range produce indifferent results.

The importance of this inclination of the leg 6 from the leg 5 is the fact that this is the mechanism by which the angle of attack is caused to change. If the legs 5 and 6 are parallel, the angle of attack will remain constant at all positions of the airplane 16. If the inclination of leg 6 from leg 5 exceeds 8°, the angle of attack will increase so rapidly, as the airplane 16 approaches its position of rest, that this angle will become too great to be operative.

If the leg 6 is designed to be longer than the leg 5 and mounted to the base 1 below the point where leg 5 is mounted to the base 1, the structure becomes inoperative because it is impossible for the airplane 16 to descend more than a portion of the distance to its rest position. This arises from the fact that the arcs described by the upper ends of the legs 5 and 6 separate when the rearward leg is longer than the forward leg. If the leg 6 is designed to be shorter than the leg 5 and the pins 22 are maintained in a horizontal plane when the airplane 16 is in erected position, the angle at which the leg 6 slopes away from the leg 5 may be decreased but the legs must be relocated in order that leg 5 may pass pin 8 as airplane 16 approaches its position of rest.

The structure may be made so that leg 6 is perpendicular and leg 5 is inclined away from leg 6 or both legs are inclined away from the perpendicular in opposite directions, so long as the angle inscribed between them does not exceed 8°. This limitation of the angle between the legs 5 and 6 is also dependent upon another factor. This factor is the ratio that the spacing of the legs, at the base, bears to the length of the legs. The important length of the legs is their operative length, that is, the distance between the point of pivotal mounting to the base 1 and the point of pivotal mounting to the wall 20. In the above discussion the ratio used was 1 to 6 with the length of the legs as the greater dimension. When this ratio is decreased to about 1 to 2½ all change in the angle of attack substantially ceases. When the ratio is increased above approximately 1 to 12 the change in the angle of attack becomes too great between the rest position and the erected flight position of the airplane 16. Thus, the optimum design incorporates a ratio of approximately 1 to 6 between the spacing of the lower ends of the legs and the length of the legs between their pivotal mountings, and the legs are inclined away from each other at approximately 2°.

The base 1 may be made of any suitable material such as steel, plastic or aluminum and may be given any desired corrosion resistant coating which will also provide it with an attractive appearance. The legs 5 and 6 may be made of any suitable material, such as plastic, aluminum or steel, which will give them rigidity. Plastic or aluminum are preferred materials because of their light weight. The lighter the weight of the legs 5 and 6 the lower the velocity at which the airplane 16 will start to rise. The legs 5 and 6 may be round, square or streamlined in shape. The streamlined shape is considered preferable in order to reduce the factor of drag to a minimum. The airplane 16 may be formed from any suitable light weight material, such as plastic or wood, and provided with any type of smooth finish which is found to be attractive and corrosion resistant. The lighter the weight of the material employed for the airplane 16, the lower the velocity that will be required to initiate its rise. Plastic has been found to be a preferred material for the construction of the airplane 16 because of its combination of strength, light weight and enduring finish.

A spring 24 anchored to the rearward end of the wall 20 extends downwardly to engage the leg 6 immediately below the wall 20 when the airplane 16 is in its erected flight position as shown in Figure 1. The spring 24 disengages the leg 6 as the airplane moves from the erected position shown in Figure 1 to the rest position shown in Figure 2. The purpose of the spring 24 will be explained more fully hereinafter.

*Operation*

After the aerodynamic ornament has been assembled it may be mounted in a suitable position on a vehicle such as an automobile. To accomplish this mounting, the base 1 is attached to the hood, fender, roof or other part of an automobile by means of screws through the holes 4. It will be understood that where circumstances dictate, the base 1 may be modified to fit the vehicle to which the aerodynamic ornament is to be mounted.

When the aerodynamic ornament has been mounted on the vehicle, and the vehicle is not moving and there is insufficient wind to cause the airplane 16 to rise, the airplane 16 and its associated legs 5 and 6 rest in the position shown in Figure 2. In this position, the legs 5 and 6 extend backwardly from the base 1 at a low, inclined angle. The legs 5 and 6 have a constant length at all pivotal positions, thus, the position of the ends of each of the legs relative to a theoretical, horizontal plane changes as the airplane 16 rises from its rest position to its flight position. The positions of the various parts relative to each other change as the airplane rises from its position of rest, as shown in Figures 6, 7 and 8. In Figures 6, 7 and 8 the plane A represents a theoretical, horizontal plane passing through the centerline of the pins 7 and 8 pivotally mounting the lower ends of the legs 5 and 6 to the base 1. Since the pins 7 and 8 are spaced a substantial distance apart in a forward and rearward direction, and this spacing is greater at the wall 20 than at the base 1, when the legs are in the rearwardly inclined position, the point of attachment of the leg 5 to the wall 20 is forward and above the point of attachment of the leg 6 to the wall 20. This causes the center line B of the airplane to be inclined upwardly at a sharp angle in a forward direction. In this position the wings 19 of the airplane are so inclined that they have a wide angle of attack C. In such a position the wide angle of attack C provides the airplane 16 with a large coefficient of lift. Thus, considering the velocity with which the airplane 16 is moving through the supporting medium as constant, the airplane is provided with its greatest coefficient of lift when it is in its rest position. Therefore, the airplane 16 will be caused to assume a position of flight at a much lower velocity than would occur if the angle of attack C were small as is the case when the airplane is in level flight, as shown in Figure 8. As the airplane 16 continues to rise, the legs 5 and 6 pivot about the pins 7 and 8, and the points of attachment of the legs 5 and 6 to the wall 20 approach each other vertically. This change in the relative vertical positions of the upper ends of the legs 5 and 6 causes the center line B of the airplane 16 to approach a horizontal position. This in turn reduces the angle of attack C and at the same time reduces the coefficient of lift, considering the velocity of the airplane 16 relative to the supporting medium as constant. The position of the airplane 16, in partially erected position, is illustrated in Figure 7. When the airplane reaches its maximum erected or full flight position, as shown in Figures 1 and 8, the centerline B of the airplane becomes horizontal, thus, parallel to the plane A. In this erected flight position, the angle of attack C is reduced to a point at which the airplane will just maintain an erected position at a predetermined minimum velocity. However, in actual practice, the coefficient of lift remains substantially the same whether the airplane is in its position of rest, as shown in Figures 2 and 6, or in its fully erected flight position, as shown in Figures 1 and 8, because the increase in velocity with which the airplane is moving through the supporting medium increases, and this increase is sufficient, normally, to provide a coefficient of lift that is approximately the same, whether the airplane is in its rest position or in fully erected flight position. Thus, what is lost in the coefficient of lift due to reduction of the angle of attack C is compensated for by the increased lift due to the increased velocity of forward motion. In this manner, the airplane 16 is provided with sufficient coefficient of lift when in rest position that it will become self-supporting in its supporting medium at low velocities yet have efficient flight characteristics after the velocity of the airplane 16 has been multiplied several times beyond that at which flight will be initiated. Thus, an aerodynamic ornament is produced which will fly efficiently at both low speeds and high speeds. This versatility of the ornament can only be accomplished by varying the angle of attack to adjust the flight characteristics of the ornament to the wide variety of operating circumstances.

When the airplane 16 is in its rest position, the forward leg 5 rests against the spring 9 and the rearward leg 6 rests against the stop 23. The spring 9 serves a dual purpose. First, it provides a cushion in the event that the vehicle upon which the ornament is mounted is accelerated suddenly and the airplane 16 is thrown back rapidly from its erected flight position to its rest position. This cushioning effect prevents the imposition of excessive strains on the pins 7 and 8 and sharp impacts between the stop 23 and the leg 6. The second purpose of the spring 9 is to provide a resilient means to partially overcome the inertia of the ornament when the airplane 16 is in its rest position. The spring 9 urges the airplane upwardly toward its erected position. However, it is designed to have insufficient strength to raise the airplane 16 without the aid of some lift from the airfoil wing surface 19. However, by providing this aid to the lift coefficient of the wings 19, the airplane 16 is caused to assume a position of flight at a lower velocity than would otherwise occur. The spring 9 may be eliminated and a stop similar to the stop 23 may be substituted for it. This substitution, although somewhat simplifying the structure, will produce an ornament having somewhat less satisfactory operating characteristics.

The spring 24 operates in a capacity similar to that of spring 9 but is active only when the airplane 16 is in erected position. As the airplane 16 approaches its maximum erected flight position, the spring 24 contacts the rearward edge of the leg 6 and urges the airplane rearwardly toward its position of rest. Thus, the spring 24 serves as a cushion or damper against shocks which tend to throw the airplane 16 forward suddenly. It also prevents the airplane 16 from becoming stalled in erected position whereby it would not return to its rest position. The tension of the spring 24 must not be so great that it prevents the airplane 16 from reaching its fully erected position. The spring 24, like the spring 9, may be eliminated. However, in such event the legs 5 and 6 should be so designed that, in fully erected position, they have a slight rearward slope to prevent stalling in the fully erected position. The elimination of the springs 9 and 24 in the manner described eliminates the desirable cushion against shocks.

The downward motion of the airplane 16 is limited by the stop 23 contacting the leg 6. The spring 9 provides a cushion as the airplane moves downwardly towards its rest position and the stop 23 provides a positive limit to this movement.

The expansible joint 10, although not essential to the operation of my aerodynamic ornament, is a convenient means by which the length of the leg 6 may be adjusted relative to leg 5 in order that the angle of attack C may be adjusted as required. When the ornament mounted on the ends of the legs 5 and 6 is changed, requiring an adjustment in the angle of attack, the expansion joint makes this adjustment a simple operation. It is also possible to place the expansible joint in the front leg 5 or to have one in each leg. However, this latter use of two expansible joints is not considered necessary.

*Example I*

Using as the ornament an airplane modeled after the military aircraft designated as type P-80 having an eight inch wing span and formed entirely of plastic, a test flight was made. The weight of the block or wall 20 and the legs was 2½ ounces. The weight of the ornament itself, without the legs and base, was 2 ounces. The angle of attack of the wings of the airplane was 3°, when the airplane was in fully erected position, and 24° when the airplane was in its rest position. For test purposes the ornament was mounted on the hood of a passenger automobile. The experiment was carried out under conditions in which there was no wind, either in the direction of flight or transverse thereto. The ornament started to rise from its position of rest when the velocity of forward motion reached 15 miles per hour. The ornament continued to rise as the velocity of forward motion was increased until it reached its maximum erected position at 30 miles per hour.

Example II

In this experiment a model airplane was used as the ornament. The ornament was modeled after the military aircraft designated as type P-80 and was made of wood. The model had a wing span of five inches and a weight of one ounce. The weight of the top block or wall 20 and the legs 5 and 6 was 2½ ounces. The angle of attack of the wings of the airplane was 3°, when the airplane was in fully erected position, and 24° when the airplane was in rest position. The experiment was carried out with no wind either in the direction of flight or transverse thereto. The ornament started to rise from its position of rest when its forward velocity reached 15 miles per hour and it reached a maximum erected position when a speed of 30 miles per hour was attained.

Numerous modifications may be made of my aerodynamic ornament, such as by substituting a tension or flexible member 50 for the leg 5. This substitution is possible because the leg 5 is in tension at all times. The use of such a flexible member is illustrated in Figures 9 and 10. When the flexible member 50 is used, the center of gravity 51 must, at all times, be maintained forward of the rear or rigid leg 6. In such a construction, when the airfoil member 52 is in its down or at rest position, it is forced to pivot forwardly about the upper end of the leg 6 because the center of gravity 51 is ahead of the leg 6. The forward rotation of the airfoil member is limited by a stop 53 which corresponds exactly to the stop 23. As the velocity of forward motion of the aerodynamic ornament is increased, the flexible member 50 prevents the moment generated by the coefficient of lift from rotating the airfoil member about its mounting to the leg 6. Thus, the force represented by the coefficient of lift is translated into a change in altitude of the ornament. As the velocity of forward motion is increased, the ornament rises and the change in relative positions of the mountings of the leg 6 and the flexible member 50 to the airfoil member 52 causes the angle of attack to decrease. The operation is identical to that of the ornament when the legs 5 and 6 are used. When the flexible member 50 is substituted for the leg 5, the same relationships as existed between legs 5 and 6, such as the ratio of spacing to length and the angle at which they diverge, must be maintained. When the flexible member 50 is substituted for the rigid leg 5, the lift vector must be maintained substantially forward of the mounting of the leg 6 to the airfoil member 52 in order to overcome the tendency of the airfoil member to pivot forwardly about the leg 6 due to the forward position of the center of gravity 51.

The necessary cushioning at the forward and rearward limits of travel of the airfoil member 52 is provided by a U-shaped spring 54 mounted in the base 55 (Fig. 11). One end 56 of the spring 54 is designed to contact the leg 6 when the ornament reaches its maximum erection and thus provides a cushion against sudden forward motion, and the other end 57 of the spring 54 is designed to contact the leg 6 when the ornament is in its rest position. The end 57 of the spring provides a cushion against shock due to sudden change in velocity of forward motion when the airfoil member 52 is in its rest position. Although the use of the flexible member 50 in place of the rigid leg 5 has been shown as a substitute construction, the use of the two rigid legs is a preferred construction.

The springs 9 and 24 may be eliminated by the substitution of resilient snubbers in the base. Such a construction is shown in Figure 12. The function of the spring 24 is taken over by the resilient snubber 75 and the function of the spring 9 is taken over by the resilient snubber 76. The snubbers 75 and 76 are cemented or otherwise firmly mounted to the base 77. The snubbers 75 and 76 may be made of any suitable material such as rubber or a resilient plastic. They should have sufficiently low durometer hardness that the legs 5 and 6 are able to travel a short distance after making contact with the snubbers. This spongy characteristic of the snubbers is also essential to provide the desired resiliency to urge the ornament away from either its at rest position or fully erected position when such urging is desired.

The description of my aerodynamic ornament has been made using an airplane as the airfoil member. However, as shown in the modified form in Figures 9 and 10 the use of a simple airfoil member having no relation to any particular existing flying implement may be substituted. In similar fashion numerous other types of ornaments having the essential characteristics of an airfoil may be employed. It is also possible to utilize my supporting structure in connection with an airfoil member under circumstances in which the supporting structure and airfoil member are stationary and energy necessary for generating lift is obtained from the movement of the air. Where such use is made of my invention, its operation will be dependent upon wind velocity, whether natural or artificially created. The velocity of wind necessary to operate my invention under such circumstances can be controlled by regulating the weight of the airfoil member and supporting structure in relation to the total area of effective airfoil surface.

Numerous other modifications of my invention may be made without departing from the principles of construction and operation embodied therein. Each of such modifications are to be considered as included in each of the hereinafter appended claims unless such claims by their terms expressly provide otherwise.

I claim:

1. A supporting structure for an airfoil member adapted to be moved primarily in one direction, said supporting structure comprising: a base; a pair of elongated, spaced leg members tandemly arranged in said direction of movement and attached to said base for pivotal travel parallel to said direction of movement from a substantially horizontal position to a maximum vertical position substantially perpendicular to said horizontal position; said leg members in said vertical position diverging outwardly from said base; a wall element for supporting said airfoil member mounted on the ends of said leg members remote from said base; when said leg members are in said substantially horizontal position, said airfoil member having a substantial angle of attack; said airfoil member being movable with said wall element and said leg members, whereby the angle of attack of said airfoil member is reduced as the position of said leg members approaches said vertical position.

2. A supporting structure for an airfoil member as described in claim 1 wherein means are provided for adjusting the length of one of said leg members whereby said angle of attack of said airfoil member may be adjusted.

3. A supporting structure for an airfoil member as described in claim 1 wherein resilient means are provided contacting at least one of said leg members at each extremity of the pivotal travel of said leg members for progressively halting the pivotal travel of said leg members in a direction toward the extremity of pivotal travel said leg members are approaching.

4. A supporting structure for an airfoil member as described in claim 1 wherein means are provided for adjusting the length of at least one of said leg members whereby the angle of attack of said airfoil member may be adjusted; resilient means contacting at least one of said leg members at each extremity of the pivotal travel of said leg members in the direction toward the extremity of pivotal travel said leg members are approaching.

5. In an areodynamic ornament, adapted to be moved primarily in one direction, the combination comprising: a base; a pair of elongated, spaced leg members tandemly arranged in said direction of movement and attached to said base for pivotal travel parallel to said direction of movement from a substantially horizontal position to a maximum vertical position substantially perpendicular to said horizontal position; said leg members, in said vertical position, diverging in a direction away from said base at an angle between 1° minimum and 8° maximum; the operative length of said leg members having a ratio to the spacing of said leg members at said base between 1 to 3 and 1 to 12; an airfoil member mounted on the ends of said leg members away from said base; when said leg members are in said substantially horizontal position, said airfoil member having a substantial angle of attack; said airfoil member being movable with the ends of said leg members, whereby the angle of attack of said airfoil member is reduced as the position of said leg members approaches said vertical position.

6. In an aerodynamic ornament, adapted to be moved primarily in one direction, the combination comprising: a base; a pair of elongated, spaced leg members tandemly arranged in said direction of movement and attached to said base for pivotal travel parallel to said direction of movement from a substantially horizontal position to a maximum vertical position substantially perpendicular to said horizontal position; said leg members, in said vertical position, diverging in a direction away from said base at an angle of approximately 2°; the operative length of said leg members having a ratio to the spacing of said leg members at said base of approximately 1 to 6; an airfoil member mounted on the ends of said leg members away from said base; when said leg members are in said substantially horizontal position, said airfoil member having a substantial angle of attack; said airfoil member being movable with the ends of said leg members, whereby the angle of attack of said airfoil member is reduced as the position of said leg members approaches said vertical position.

7. In an aerodynamic ornament, adapted to be moved primarily in one direction, the combination comprising: a base; a pair of elongated, spaced leg members tandemly arranged in the direction of movement and attached to said base for pivotal travel parallel to said direction of movement from a substantially horizontal position to a maximum vertical position substantially perpendicular to said horizontal position; an airplane member; an elongated wall element depending from said airplane member midway between the wing tips of said airplane member, and having its longitudinal axis parallel to said direction of movement; means pivotally mounting said leg members to said wall element spaced tandemly in said direction of movement; said leg members, in said maximum vertical position, diverging in a direction away from said base at an angle between 1° minimum and 8° maximum; means for adjusting the length of at least one of said leg members; when said leg members are in said substantially horizontal position, the wings of said airplane member having a substantial angle of attack; said airplane member being movable with said wall element, whereby the angle of attack of the wings of said airplane is reduced as the position of said leg members approaches said vertical position; resilient means contacting at least one of said leg members at each extremity of the pivotal travel of said leg members for progressively halting the pivotal travel of said leg members in the direction toward the extremity of pivotal travel said leg members are approaching.

8. A supporting structure for an airfoil member adapted to be moved primarily in one direction, said supporting structure comprising: a base; at least one pair of elongated, spaced leg members tandemly arranged in said direction of movement and attached to said base for pivotal travel parallel to said direction of movement from a substantially horizontal position to a maximum vertical position substantially perpendicular to said horizontal position; said leg members, in said vertical position, diverging outwardly from said base; a wall element, having its longitudinal axis parallel to said direction of movement, pivotally mounted to the ends of said leg members remote from said base; means attaching said airfoil member to said wall element; when said leg members are in said substantially horizontal position, said airfoil member having a substantial angle of attack; said airfoil member being movable with said wall element and said leg members, whereby the said angle of attack of said airfoil member is reduced as the position of said leg members approaches said vertical position.

JACK W. REDHEAD.

REFERENCES CITED

The following references are of record in the file of this patent:

UNITED STATES PATENTS

| Number | Name | Date |
| --- | --- | --- |
| 1,450,278 | Cave | Apr. 3, 1923 |
| 1,755,630 | Budde | Apr. 22, 1930 |
| 2,227,918 | Trombla | Jan. 7, 1941 |